US 11,536,014 B2

(12) United States Patent
Funari et al.

(10) Patent No.: US 11,536,014 B2
(45) Date of Patent: Dec. 27, 2022

(54) FLUSH VALVE

(71) Applicant: Zurn Industries, LLC, Milwaukee, WI (US)

(72) Inventors: Michael A. Funari, Apex, NC (US); Marc G. Block, Apex, NC (US)

(73) Assignee: Zurn Industries, LLC, Milwaukee, WI (US)

( * ) Notice: Subject to any disclaimer, the term of this patent is extended or adjusted under 35 U.S.C. 154(b) by 0 days.

(21) Appl. No.: 17/002,018

(22) Filed: Aug. 25, 2020

(65) Prior Publication Data

US 2020/0385971 A1 Dec. 10, 2020

Related U.S. Application Data

(63) Continuation of application No. 15/714,405, filed on Sep. 25, 2017, now Pat. No. 10,753,075.

(Continued)

(51) Int. Cl.
*F16K 31/128* (2006.01)
*E03D 3/10* (2006.01)
(Continued)

(52) U.S. Cl.
CPC ............... *E03D 3/10* (2013.01); *E03D 3/06* (2013.01); *F16K 5/0407* (2013.01); *F16K 5/12* (2013.01);
(Continued)

(58) Field of Classification Search
CPC . E03D 3/10; E03D 3/06; F16K 5/0407; F16K 5/12; F16K 31/041; F16K 31/402; F16K 31/043
(Continued)

(56) References Cited

U.S. PATENT DOCUMENTS 3,696,954 A ‡ 10/1972 Weisker .................. B66F 9/14
414/66
3,831,621 A ‡ 8/1974 Anthony .................. F16K 3/08
137/27

(Continued)

FOREIGN PATENT DOCUMENTS

EP 1096189 A1 ‡ 5/2001 ........... F16K 25/005
EP 1096189 A1 5/2001

*Primary Examiner* — Minh Q Le

(74) *Attorney, Agent, or Firm* — Michael Best & Friedrich LLP

(57) ABSTRACT

A flush valve includes a valve housing defining a fluid passageway between a fluid inlet and a fluid outlet. The fluid passageway includes a diaphragm valve seat disposed between the fluid inlet and the fluid outlet. The flush valve additionally includes a diaphragm assembly including a diaphragm and a disc. The diaphragm includes a primary opening and a bypass opening. The primary opening receives the disc therein and the bypass opening allowing water under pressure supplied to the fluid inlet to pass from a fluid inlet side of the diaphragm into a chamber in the fluid passageway. The flush valve additionally includes a relief valve configured to selectively control fluid flow from the chamber to the fluid outlet. The relief valve comprises a stationary valve element and a rotatable valve element each having at least one opening and being rotationally positionable relative to one another to regulate fluid flow.

20 Claims, 6 Drawing Sheets

Related U.S. Application Data

(60) Provisional application No. 62/399,807, filed on Sep. 26, 2016.

(51) Int. Cl.

| | | |
|---|---|---|
| *F16K 31/40* | (2006.01) | |
| *E03D 3/06* | (2006.01) | |
| *F16K 5/04* | (2006.01) | |
| *F16K 7/12* | (2006.01) | |
| *F16K 31/04* | (2006.01) | |
| *F16K 5/12* | (2006.01) | |

(52) U.S. Cl.
CPC .............. *F16K 7/12* (2013.01); *F16K 31/041* (2013.01); *F16K 31/043* (2013.01); *F16K 31/402* (2013.01)

(58) Field of Classification Search
USPC .......... 137/489, 487.5, 613, 625.15, 625.65, 137/624.11; 251/129.11, 129.04, 30.01, 251/40; 4/305, 304, 302, 314
See application file for complete search history.

(56) References Cited

U.S. PATENT DOCUMENTS

| | | | | |
|---|---|---|---|---|
| 3,834,416 | A ‡ | 9/1974 | Parkison | F16K 3/08 137/55 |
| 4,420,811 | A ‡ | 12/1983 | Tarnay | G05D 23/1393 137/56 |
| 4,501,297 | A ‡ | 2/1985 | Baker | F16K 31/042 137/55 |
| 4,611,757 | A ‡ | 9/1986 | Saether | G05D 23/1393 236/12 |
| 4,700,885 | A ‡ | 10/1987 | Knebel | G05D 23/1393 236/12 |
| 4,793,588 | A ‡ | 12/1988 | Laverty, Jr. | E03D 3/06 251/30 |
| 4,821,765 | A ‡ | 4/1989 | Iqbal | F16K 3/08 137/27 |
| 5,022,429 | A ‡ | 6/1991 | Rollini | E03C 1/104 137/21 |
| 5,169,118 | A ‡ | 12/1992 | Whiteside | E03D 5/10 251/129.04 |
| 5,174,324 | A ‡ | 12/1992 | Chrysler | F16K 3/08 137/315.13 |
| 5,223,822 | A | 6/1993 | Stommes et al. | |
| 5,244,179 | A ‡ | 9/1993 | Wilson | E03D 5/10 251/28 |
| 5,411,241 | A ‡ | 5/1995 | Nilsson | E03C 1/08 251/12 |
| 5,417,083 | A ‡ | 5/1995 | Eber | F25B 41/062 62/528 |
| RE35,545 | E ‡ | 7/1997 | Chrysler | F16K 3/08 137/315.11 |
| 5,681,028 | A ‡ | 10/1997 | Cook | F16K 3/08 137/454.5 |
| 5,868,311 | A ‡ | 2/1999 | Cretu-Petra | E03C 1/057 236/12 |
| 5,918,626 | A ‡ | 7/1999 | Strong | E03C 1/04 137/45 |
| 6,000,674 | A ‡ | 12/1999 | Cheng | E03D 3/06 137/545 |
| 6,044,791 | A | 4/2000 | LaMarca et al. | |
| 6,056,201 | A ‡ | 5/2000 | Ta | G05D 23/1393 137/62 |
| 6,209,581 | B1 ‡ | 4/2001 | Gyozo | F16K 11/0782 137/62 |
| 6,341,731 | B1 ‡ | 1/2002 | Knapp | G05D 23/1353 137/62 |
| 6,349,921 | B1 ‡ | 2/2002 | Jahrling | E03D 3/04 251/129.04 |
| 6,457,697 | B1 ‡ | 10/2002 | Kolze | F16K 31/404 251/30.02 |
| 6,634,380 | B2 ‡ | 10/2003 | Bartkus | F16K 11/0743 137/62 |
| 6,676,024 | B1 ‡ | 1/2004 | McNerney | G05D 23/1393 236/12 |
| 6,820,647 | B1 | 11/2004 | Grecco et al. | |
| 6,840,496 | B2 ‡ | 1/2005 | Maercovich | E03D 3/06 251/129.03 |
| 6,845,524 | B2 ‡ | 1/2005 | Hwang | E03D 3/06 251/40 |
| 6,845,961 | B2 ‡ | 1/2005 | Maercovich | E03D 3/06 251/129.03 |
| 6,854,658 | B1 ‡ | 2/2005 | Houghton | F16K 11/0746 137/62 |
| 6,959,731 | B2 ‡ | 11/2005 | Bartkus | F16K 11/0743 137/62 |
| 7,325,747 | B2 ‡ | 2/2008 | Jonte | B05B 12/087 137/62 |
| 7,373,950 | B2 ‡ | 5/2008 | Huang | F16K 11/0785 137/62 |
| 7,458,520 | B2 ‡ | 12/2008 | Belz | G05D 23/1393 236/12 |
| 7,510,166 | B2 ‡ | 3/2009 | Maercovich | E03D 3/06 251/129.03 |
| 7,584,898 | B2 ‡ | 9/2009 | Schmitt | E03C 1/05 137/35 |
| 7,624,757 | B2 ‡ | 12/2009 | Schmitt | E03C 1/05 137/60 |
| 7,631,505 | B2 ‡ | 12/2009 | Seitz | F16K 3/10 251/12 |
| 7,669,776 | B2 ‡ | 3/2010 | Beck | G05D 23/1346 236/12 |
| 7,717,131 | B2 ‡ | 5/2010 | Creswell | F16K 3/10 137/62 |
| 7,726,338 | B2 ‡ | 6/2010 | Clasen | F16K 3/085 137/62 |
| 7,802,733 | B2 ‡ | 9/2010 | Schmitt | G05D 23/1393 236/12 |
| 7,946,504 | B2 ‡ | 5/2011 | Shapira | G05D 23/1393 236/12 |
| 8,087,636 | B2 ‡ | 1/2012 | Maercovich | F16K 31/404 251/30 |
| 8,091,856 | B2 ‡ | 1/2012 | Maercovich | F16K 31/404 251/30 |
| 8,375,990 | B2 ‡ | 2/2013 | Veros | F16K 11/0743 137/62 |
| 8,485,496 | B2 ‡ | 7/2013 | Johnson | E03D 3/02 251/129.04 |
| 8,585,009 | B2 ‡ | 11/2013 | Zhu | F16K 31/047 251/69 |
| 8,596,606 | B2 ‡ | 12/2013 | Maercovich | F16K 31/404 251/30 |
| 8,714,516 | B2 ‡ | 5/2014 | Maercovich | F16K 31/3855 137/808 |
| 8,739,829 | B2 ‡ | 6/2014 | Maercovich | E03D 3/06 137/62 |
| 9,340,959 | B2 ‡ | 5/2016 | Peel | E03B 7/078 |
| 9,366,015 | B2 ‡ | 6/2016 | Peel | E03C 1/0404 |
| 9,574,336 | B1 ‡ | 2/2017 | Maercovich | F16K 31/042 |
| 9,594,383 | B2 ‡ | 3/2017 | Peel | F17D 1/00 |
| 9,644,757 | B2 ‡ | 5/2017 | Peel | F16K 17/36 |
| 9,650,770 | B2 ‡ | 5/2017 | Peel | B05B 1/18 |
| 9,689,149 | B2 ‡ | 6/2017 | Peel | B05B 1/24 |
| 9,803,759 | B2 ‡ | 10/2017 | Bachofer | F16K 27/045 |
| 9,850,644 | B1 ‡ | 12/2017 | Huang | E03D 3/06 |
| 10,578,228 | B2 | 3/2020 | Block et al. | |
| 10,753,075 | B2 | 8/2020 | Funari et al. | |
| 2003/0088338 | A1 ‡ | 5/2003 | Phillips | F16K 19/006 700/28 |
| 2003/0178591 | A1 ‡ | 9/2003 | Hwang | F16K 31/3855 251/26 |
| 2004/0193326 | A1 ‡ | 9/2004 | Phillips | B67D 1/1204 700/28 |
| 2007/0068583 | A1 ‡ | 3/2007 | Johnson | F16K 31/043 137/62 |

(56) References Cited

U.S. PATENT DOCUMENTS

| | | | |
|---|---|---|---|
| 2012/0248353 A1 | 10/2012 | Furukawa et al. | |
| 2013/0075483 A1 ‡ | 3/2013 | Marty | E03C 1/057 236/12 |
| 2014/0345729 A1 ‡ | 11/2014 | Chang | F16K 11/076 137/625.15 |
| 2014/0359935 A1 ‡ | 12/2014 | Veros | F16K 37/0041 4/677 |
| 2015/0168960 A1 ‡ | 6/2015 | Huck | G05D 23/1925 236/12 |
| 2015/0233483 A1 ‡ | 8/2015 | Bachofer | E04F 13/148 137/62 |
| 2016/0186867 A1 ‡ | 6/2016 | Maercovich | F16K 3/08 251/12 |
| 2016/0252915 A1 ‡ | 9/2016 | Peel | G05D 23/19 137/3 |
| 2016/0333556 A1 ‡ | 11/2016 | Veros | F16K 31/043 |
| 2017/0152961 A1 ‡ | 6/2017 | Peel | E03C 1/044 |
| 2017/0219114 A1 ‡ | 8/2017 | Peel | F16K 17/36 |
| 2017/0298608 A1 ‡ | 10/2017 | Maercovich | F16K 3/0254 |
| 2017/0032181 A1 ‡ | 11/2017 | Hashimoto | F16K 1/523 |
| 2017/0321809 A1 ‡ | 11/2017 | Hashimoto | F16K 31/041 |
| 2017/0321811 A1 | 11/2017 | Hashimoto et al. | |
| 2017/0322565 A1 ‡ | 11/2017 | Hashimoto | F16K 31/404 |
| 2018/0073227 A1 ‡ | 3/2018 | Peel | F16K 11/24 |
| 2018/0241282 A1 | 8/2018 | Niekamp | |

‡ imported from a related application

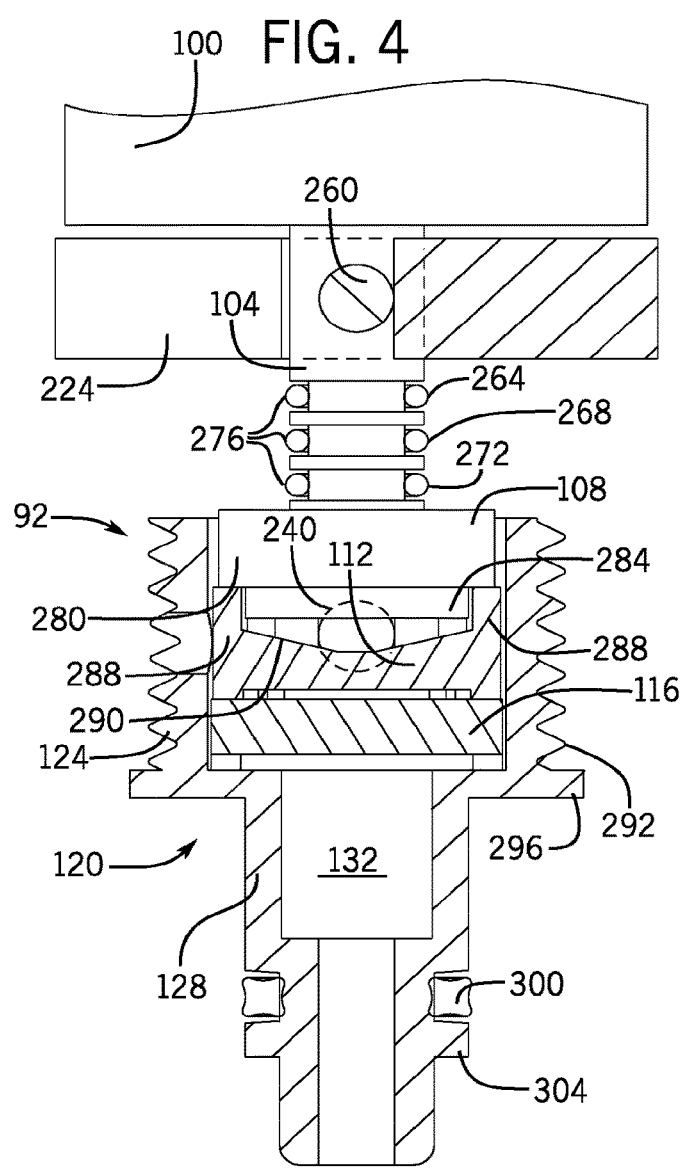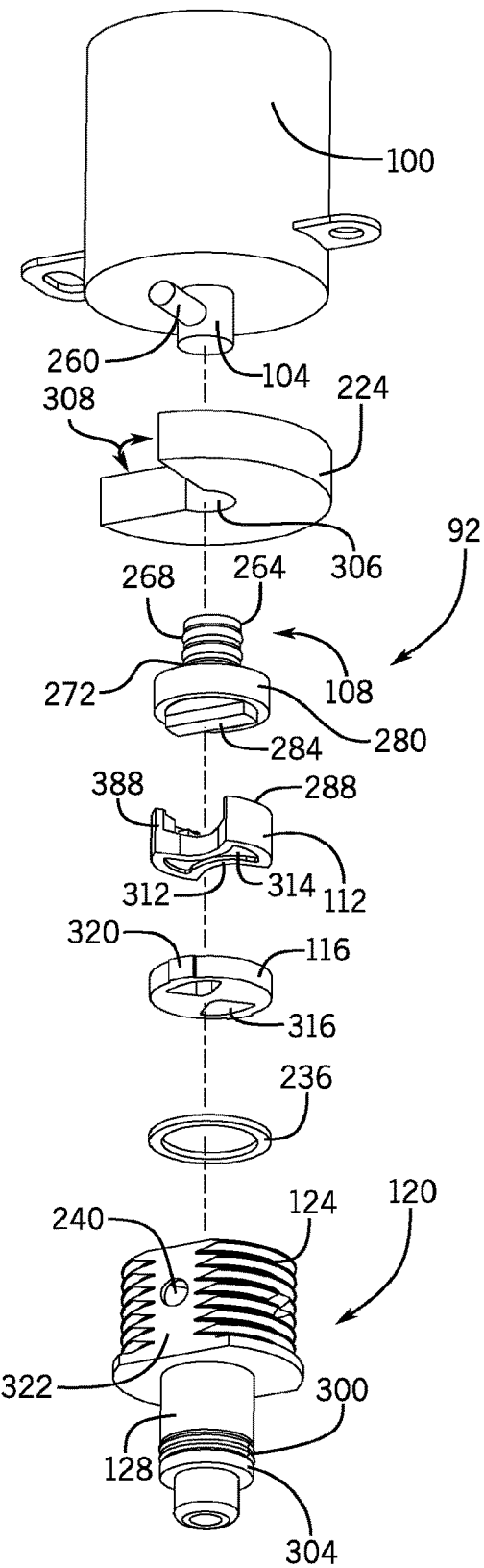

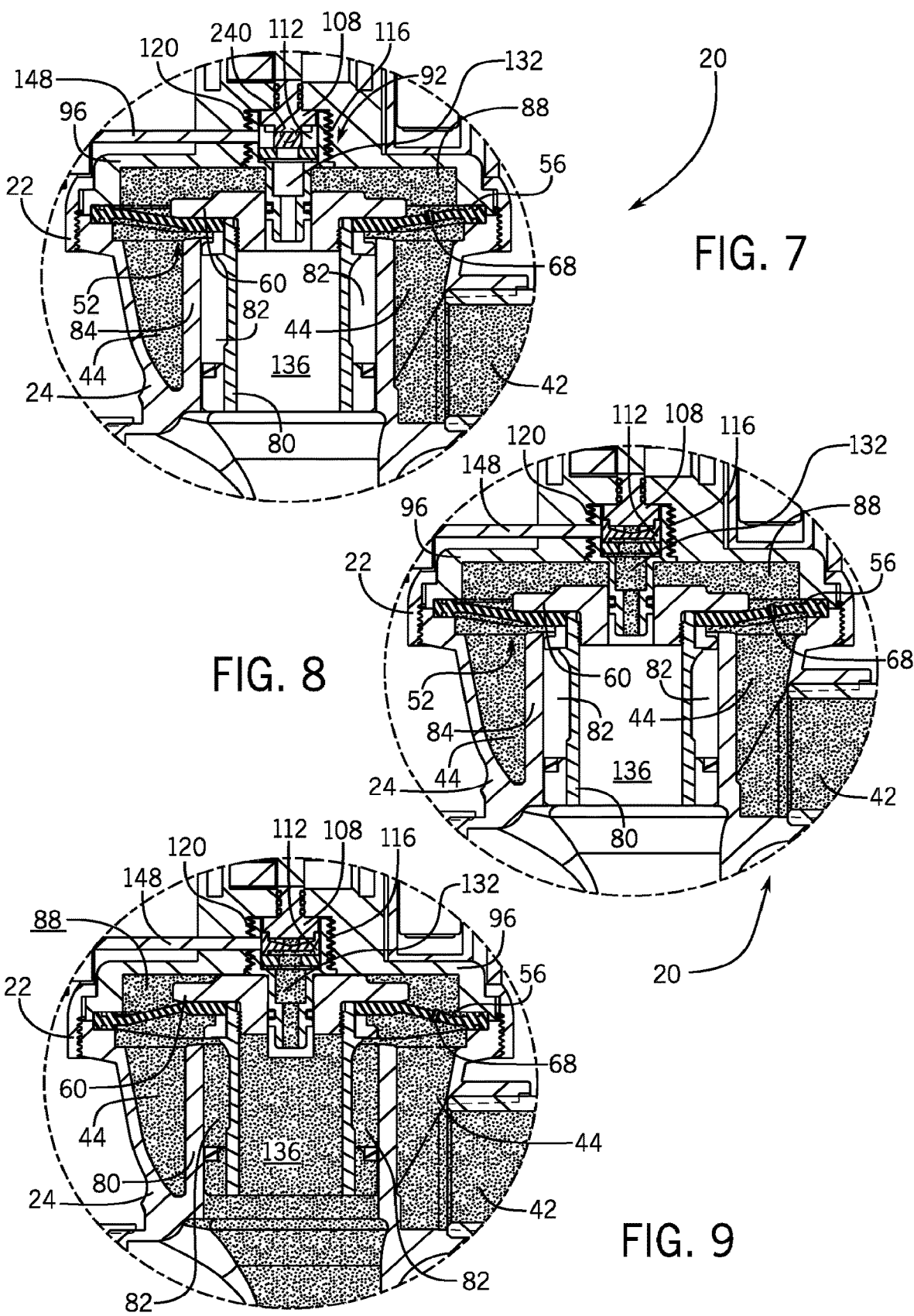

FLUSH VALVE

CROSS-REFERENCE TO RELATED APPLICATIONS

This application is a continuation of U.S. patent application Ser. No. 15/714,405, filed on Sep. 25, 2017, which claims the benefit of U.S. Provisional Patent Application No. 62/399,807 filed on Sep. 26, 2016, the contents of which are incorporated by reference for all purposes as if set forth in their entirety herein.

FIELD OF INVENTION

This disclosure relates to a flush valve and the operation thereof, which allows the actuation of a flush cycle.

BACKGROUND

Manual flush valves for use in urinals, water closets, and toilets are well known in the art. Two common types of flush valves are diaphragm flush valves and piston flush valves. Diaphragm flush valves typically include a fluid inlet and a fluid outlet separated by a diaphragm that selectively prevents fluid from flowing from the fluid inlet to the fluid outlet. The diaphragm of a flush valve selectively prevents fluid from flowing from the fluid inlet to the fluid outlet by being disposed on a valve seat of the fluid outlet. The diaphragm of the flush valve includes a relief valve which selectively allows fluid to pass from the fluid inlet to the fluid outlet. The relief valve commonly features a valve stem that extends downward into the fluid outlet. The valve stem interfaces with a plunger connected to a manual lever arm. The manual lever arm is actuated by a user which pushes the plunger into contact with the valve stem. The contact of the plunger with the valve stem laterally displaces the valve stem which causes the relief valve to slightly open fluid communication between the fluid inlet and the fluid outlet. The slight opening in fluid communication caused by the displacement of the valve stem reduces pressure pressing the diaphragm onto the valve seat which allows the diaphragm to unseat from the valve seat. The unseating of the diaphragm from the valve seat allows additional fluid to flow from the fluid inlet to the fluid outlet. When the user releases the manual lever arm, the plunger returns to its original position. The valve stem returns to its original position when it is not being actuated by the plunger, and when the valve stem is in its original position, the relief valve is closed. Fluid pressure builds on the diaphragm with the relief valve closed. The increase in pressure on the diaphragm due to the closing of the relief valve presses the diaphragm onto the valve seat. Fluid communication between the inlet and the outlet is thereby closed with the diaphragm disposed on the valve seat and the relief valve closed.

Automated flush valves are also well known in the art. Automated flush valves commonly rely on sensors that detect the presence of a user in order to initiate a flush as opposed to a manual lever arm that requires actuation by a user. Automated flush valves have similar internal structures to manual flush valves. As noted with manual diaphragm flush valves, automated flush valves include a fluid inlet and a fluid outlet separated by a diaphragm that selectively prevents fluid from flowing from the fluid inlet to the fluid outlet. The diaphragm of the flush valve selectively prevents fluid from flowing from the fluid inlet to the fluid outlet by being disposed on a valve seat of the fluid outlet. The diaphragm of a flush valve includes a relief valve which selectively allows fluid to pass from the fluid inlet to the fluid outlet. The relief valve commonly features a valve stem that extends downward into the fluid outlet. The valve stem interfaces with a plunger connected to an automated actuation mechanism. The automated actuation mechanism is configured to push the plunger into contact with the valve stem. The automated actuation mechanism can be a motor coupled to a gear train, a solenoid, or other automated actuation mechanisms. The contact of the plunger with the valve stem laterally displaces the valve stem which causes the relief valve to slightly open fluid communication between the fluid inlet and the fluid outlet. The slight opening in fluid communication caused by the displacement of the valve stem reduces pressure pressing the diaphragm onto the valve seat which allows the diaphragm to unseat from the valve seat. The unseating of the diaphragm from the valve seat allows additional fluid to flow from the fluid inlet to the fluid outlet. When the automate actuation mechanism releases from contact with the plunger, the plunger returns to its original position. The valve stem returns to its original position when it is not being actuated by the plunger, and when the valve stem is in its original position, the relief valve is closed. Fluid pressure builds on the diaphragm with the relief valve closed. The increase in pressure on the diaphragm due to the closing of the relief valve presses the diaphragm onto the valve seat. Fluid communication between the inlet and the outlet is thereby closed with the diaphragm disposed on the valve seat and the relief valve closed.

The actuation of the valve stem by the plunger causes the valve stem to be at an angle with respect to the valve seat. The angle of the valve stem selectively opens the relief valve by tilting the relief valve at an angle relative to the valve seat. The selective opening of the relief valve is unpredictable due to variations in pressure applied to the diaphragm in addition to the variation in the actuation by a user or an automated actuation mechanism. The unpredictability of the opening causes control and precision problems. The amount of fluid flowing through the opening is correlated to the size of the opening in the relief valve. The amount of fluid flowing through the flush valve is difficult to control due to the unpredictability of the opening in the relief valve. The timing of a flush cycle is also correlated to the size of the opening allowing water to pass through the relief valve. The unpredictability of the opening in the relief valve also makes the timing of a flush cycle difficult to control.

It is therefore desirable for a flush valve to more precisely control the opening in the relief valve and improve durability of the components in the flush valve.

SUMMARY OF THE INVENTION

Proposed herein is an alternative design for a flush valve. The proposed design may be a retrofit design to replace an existing flush valve. The proposed design may also be a standalone unit or employ any other installation methods. The proposed design features an alternative flush valve that can utilize an alternative relief valve that allows for precise control of the opening of the relief valve, reduces durability of the components in the flush valve, and removes components from the fluid outlet flow path.

According to one aspect, the flush valve has a valve housing that defines a fluid passageway between a fluid inlet and a fluid outlet. The fluid passageway has a diaphragm valve seat disposed between the fluid inlet and the fluid outlet. The flush valve also has a diaphragm assembly that includes a diaphragm and a disc. The diaphragm has a primary opening and a bypass opening. The primary opening in the diaphragm is configured to receive the disc therein. The bypass opening allows water under pressure supplied to the water inlet to pass from a water inlet side of the diaphragm into a chamber in the fluid passageway. The chamber in the fluid passageway is established by the presence of the diaphragm assembly in the fluid passageway. The diaphragm assembly is disposed in the fluid passageway and moves between an opened position in which the disc of the diaphragm assembly is not in contact with the diaphragm valve seat and a closed position in which the disc of the diaphragm assembly is in contact with the diaphragm valve seat. The flush valve also has a relief valve configured to selectively control fluid flow from the chamber to the fluid outlet. The relief valve has a stationary valve element and a rotatable valve element. The stationary valve element and rotatable valve element each have at least one opening, and they are rotationally positionable relative to one another to regulate fluid flow. The disc contacts the diaphragm valve seat to form a seal between the disc and the diaphragm valve seat when the diaphragm assembly is in the closed position and with the relief valve closed. When the flush valve is activated, the relief valve is opened to permit a flow of water from the chamber into the fluid outlet. The opening of the relief valve relieves fluid pressure in the chamber and causes diaphragm assembly to move from the closed position to the opened position. The disc is unseated from the valve seat which permits water to pass from the fluid inlet to the fluid outlet when the diaphragm assembly is in the open position.

In some forms, fluid pressure can build in the chamber when the diaphragm assembly is in the open position and the relief valve is in the closed position. The increase in fluid pressure in the chamber can cause the disc to contact the diaphragm valve seat. Contact between the disc and the diaphragm valve seat can form a seal that can return the diaphragm assembly to the closed position.

In some forms, the chamber in the fluid passageway can be established by a presence of the diaphragm assembly in the fluid passageway and a fixed member disposed within the valve housing. The fixed member may contact the diaphragm in at least one radial position and can have an extension that extends away from the diaphragm assembly. The extension of the fixed member may have an inner chamber. The inner chamber of the fixed member may be configured to receive a motor and a gear train. The inner chamber of the fixed member may further be coaxial with the relief valve. The relief valve may also be configured to be coaxial with a motor. The fixed member can be configured to ensure accurate flush volume. The position of the rotatable valve element can be configured to be controlled by a motor and a gear train.

In some forms, the relief valve can have a rigid frame. The rigid frame of the relief valve can have an inlet region and an outlet region. The inlet region of the rigid frame can be configured to receive the stationary valve member and the rotatable valve member. The inlet region of the rigid frame can further have two flat outer faces with one or more openings in selective fluid communication with the chamber. The outlet region of the rigid frame can be configured to allow fluid to pass through the relief valve when the relief valve is in the open position.

In some forms, the diaphragm valve seat may define a peripheral fluid passageway. The peripheral fluid passageway can be in fluid communication with the fluid inlet and the fluid outlet when the diaphragm assembly is in the open position. This can allow additional fluid to flow from the fluid inlet to the fluid outlet.

In some forms, the relief valve can be a quarter-turn valve, while in other forms the relief valve can be a half-turn valve or an eighth turn valve. One of ordinary skill in the art will appreciate that the relief valve can take the form of any rotatable valve assembly. In other forms the relief valve can be a translational valve. The diaphragm can be selectively flexible and may be configured to bend to allow the diaphragm assembly to move from the closed position to the open position. The disc can have a circular outer periphery. The flush cycle can be any appropriate amount of time. In a non-limiting example, a period of time range for the relief valve assembly to be in an open position may be from 0.5 to 3 seconds which may result in the flush valve being open from 3 to 10 seconds.

In one aspect, the relief valve further may have at least one seal that prevents fluid communication external to the fluid passageway.

In one aspect, the flush valve may have a manual actuation assembly configured to selectively open the relief valve in the absence of power to permit a flow of water from the chamber into the fluid outlet thereby relieving a fluid pressure in the chamber and causing diaphragm assembly to move from the closed position to the opened position such that the disc is unseated from the diaphragm valve seat permitting water to pass from the fluid inlet to the fluid outlet.

According to another aspect, a method for operating a flush valve is provided. The method may comprise the steps of: (a) providing a fluid under pressure to a fluid passageway in a valve housing via a fluid inlet; (b) communicating the fluid through a bypass opening in a diaphragm assembly into a chamber, the diaphragm assembly is disposed in the fluid passageway and is movable between an opened position in which the diaphragm assembly is not in contact with a diaphragm valve seat and a closed position in which the diaphragm assembly is in contact with the diaphragm valve seat, wherein the chamber is established by a presence of the diaphragm assembly in the fluid passageway; (c) communicating the fluid in the chamber into a relief valve assembly, the relief valve assembly comprising a stationary valve element and a rotatable valve element each having at least one opening and being rotationally positionable relative to one another to regulate fluid flow; (d) rotating the rotatable valve element into an open position such that the at least one opening of the rotatable valve element aligns with the at least one opening of the stationary valve element; (e) communicating the fluid through the relief valve assembly to a fluid outlet; and (f) translating the diaphragm assembly from the closed position to the open position such that the diaphragm assembly is unseated from the diaphragm valve seat permitting water to pass from the fluid inlet to the fluid outlet.

These and still other advantages of the invention will be apparent from the detailed description and drawings. What follows is merely a description of some preferred embodiments of the present invention. To assess the full scope of the invention, the claims should be looked to as these preferred embodiments are not intended to be the only embodiments within the scope of the claims.

BRIEF DESCRIPTION OF THE DRAWINGS

FIG. 4 is a sectional view of the relief valve taken along line 4-4 of FIG. 2.

FIG. 5 is an exploded view of the relief valve including the motor that drives operation of the valve.

FIG. 7 is a sectional view of an area A-A from FIG. 1 of the flush valve in the closed position.

FIG. 8 is a sectional view of an area A-A of the flush valve just after a relief valve is opened.

FIG. 9 is a sectional view of an area A-A of the flush valve in the open position.

DETAILED DESCRIPTION

Embodiments of the disclosure may be further understood with reference to the figures.

Figure 1:
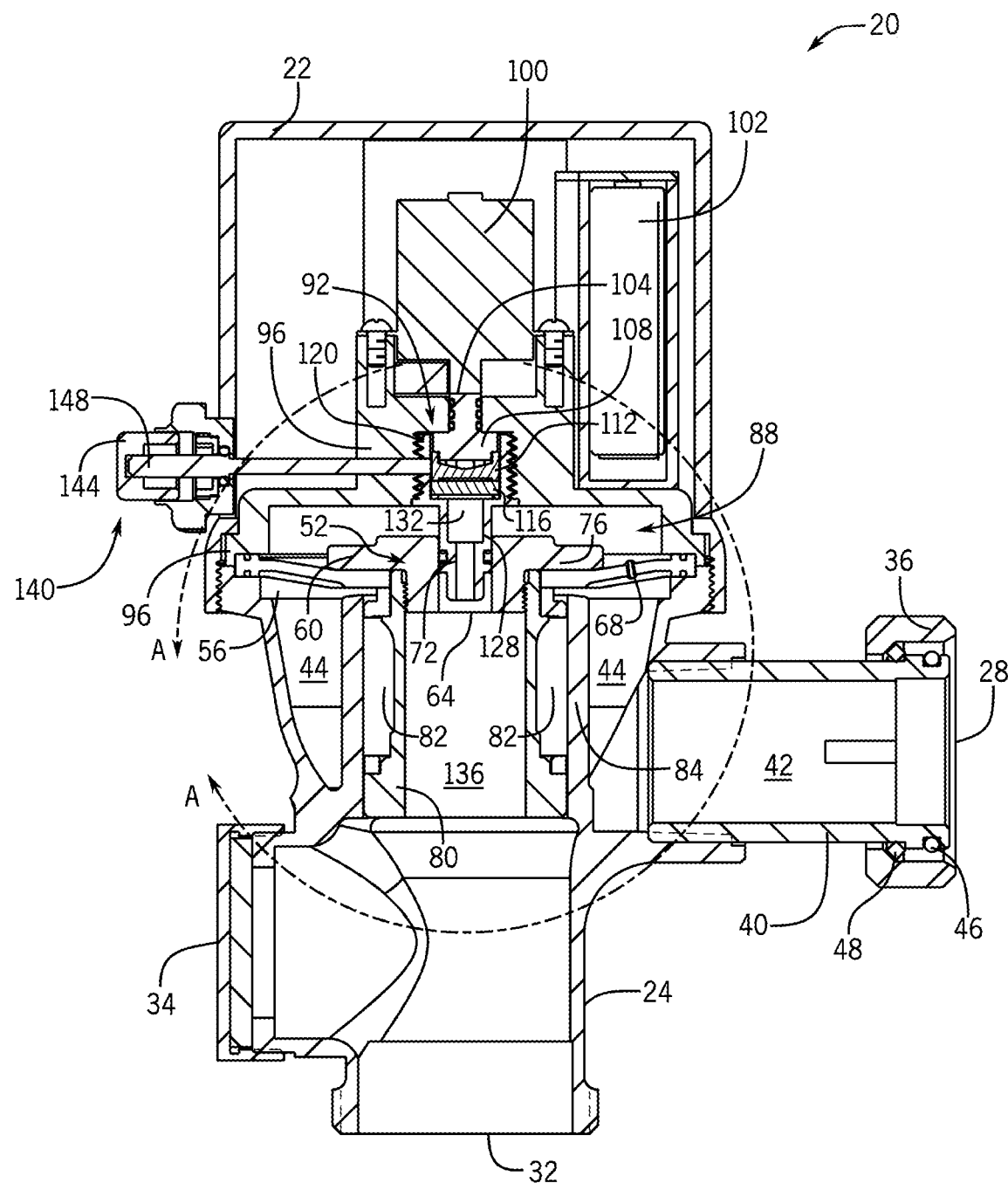
FIG. 1 is a sectional view of the flush valve.

FIG. 1 illustrates one exemplary embodiment of a flush valve 20. The flush valve 20 has a housing that includes an upper housing body 22 and a lower housing body 24 (see FIG. 3) that may be connected such that the upper housing body 22 and lower housing body 24 enclose the flush valve 20. In a nonlimiting example, the upper housing body 22 may be threaded into connection with the lower housing body 24. The lower housing body 24 may have an inlet 28, an outlet 32, and a cap 34 over an opening that would traditionally accommodate a mechanical flush lever. The inlet 28 to the lower housing body 24 may connect the lower housing body 24 to a fluid source and provide fluid communication therebetween. The inlet 28 may be secured to a fluid source via a nut 36 that circumferentially extends around an inlet extension 40, an O-ring 46, and a locking ring 48. The inlet extension 40 may be cylindrical in shape and defines a hollow inner chamber 42 for the passage of water. The lower housing body 24 receives the inlet extension 40, which extends perpendicularly outward from the lower housing body 24. The connection of the inlet extension 40 and the lower housing body 24 connects the inner chamber 42 of the inlet extension to a lower chamber 44 within the lower housing body 24.

A diaphragm assembly 52 is disposed within the upper housing body 22 and the lower housing body 24 between the inlet 28 and the outlet 32 and includes a diaphragm 56 and a disc 60. The diaphragm assembly 52 has a diaphragm assembly opening 64 and a bypass opening 68. As illustrated, the diaphragm assembly opening 64 is centrally located on the diaphragm assembly 52 and the bypass opening 68 may be peripherally located on the diaphragm assembly 52; however, they may be otherwise geometrically disposed. The diaphragm 56 and the disc 60 extend circumferentially outward, each defining an outer diameter. The outer diameter of the diaphragm 56 is larger than the outer diameter of the disc 60. The disc 60 is received in a central opening in the diaphragm 56 that aligns with the diaphragm assembly opening 64 in the diaphragm assembly 52. The diaphragm 56 receives a base end 72 of the disc 60 in the central opening in the diaphragm 56 while an outward protrusion 76 of the disc 60 is disposed above a portion of a top surface of the diaphragm 56. The base end 72 of the disc 60 is threadably connected to a diaphragm assembly extension 80. The diaphragm assembly extension 80 is positioned below the diaphragm 56 and the disc 60 and is cylindrical. The diaphragm assembly extension 80 defines a peripheral chamber 82 between an outer wall of the diaphragm assembly extension 80 and an inner wall of a valve seat 84 that extends upward in the housing as a cylindrical column. When the flush valve 20 is in the closed position as is illustrated in FIG. 1, the diaphragm assembly 52 is positioned on a top lip of the valve seat 84 which places the diaphragm assembly 52 in a sealing position between the inlet 28 and the outlet 32. An upper chamber 88 is positioned above the diaphragm assembly 52 and is in fluid communication with the lower chamber 44 via the bypass opening 68 of the diaphragm 56.

Above and downwardly extending into the upper chamber 88, there is a relief valve assembly 92. The relief valve assembly 92 is positioned within and supported by a fixed member 96 that is secured between the upper housing body 22 and lower housing body 24, and an inner surface of the fixed member 96 may also provide a top wall of the upper chamber 88 that provides a fluid boundary that prevents fluid from communicating outside of the fixed member 96. The relief valve assembly 92 includes a motor 100 connected to a power source 102 positioned outside of the fixed member 96. In a non-limiting example, the power source 102 may be one or more batteries. The motor 100 has a shaft 104 that extends out of the motor 100 and connects to a driving member 108. The driving member 108 is connected to a rotatable valve element 112 that is positioned below the driving member 108 and the shaft 104. The rotatable valve element 112 is positioned above a stationary valve element 116 (both of which are in the shape of discs). Illustratively, it should be appreciated that the rotatable valve element 112 may be a moveable valve element and/or a translatable valve element. A relief valve housing 120 has an upper body 124 and a lower body 128, in which the upper body 124 of the relief valve housing 120 receives the driving member 108, the rotatable valve element 112, and the stationary valve element 116. The upper body 124 has a threaded or barbed outer surface which may be fixed within the fixed member 96 to secure the relief valve housing 120 to the fixed member 96. The lower body 128 extends through the upper chamber 88 into the central opening of the disc 60. The relief valve assembly 92 has a chamber 132 that aligns with the opening 64 in the diaphragm assembly 52. The chamber 132 of the relief valve assembly 92 and the opening 64 in the diaphragm assembly 52 align axially with an outlet chamber 136, such that the lower end of the relief valve assembly 92 may be partially positioned within and below the diaphragm assembly extension 80.

In some embodiments, the flush valve 20 may further include a manual actuation assembly 140. The manual actuation assembly 140 can include an actuation interface 144 and an actuation member 148. The actuation interface 144 may extend outside of the upper housing body 22 and may be linked to the actuation member 148. The actuation member 148 may be fixed to the actuation interface 144 and may extend into the housing such that it can contact the rotatable valve element 112 (or some part attached thereto) to provide a manual override. Alternatively, the manual actuation assembly 140 could selectively actuate or open a secondary relief valve element apart from relief valve assembly 92.

Figure 2:
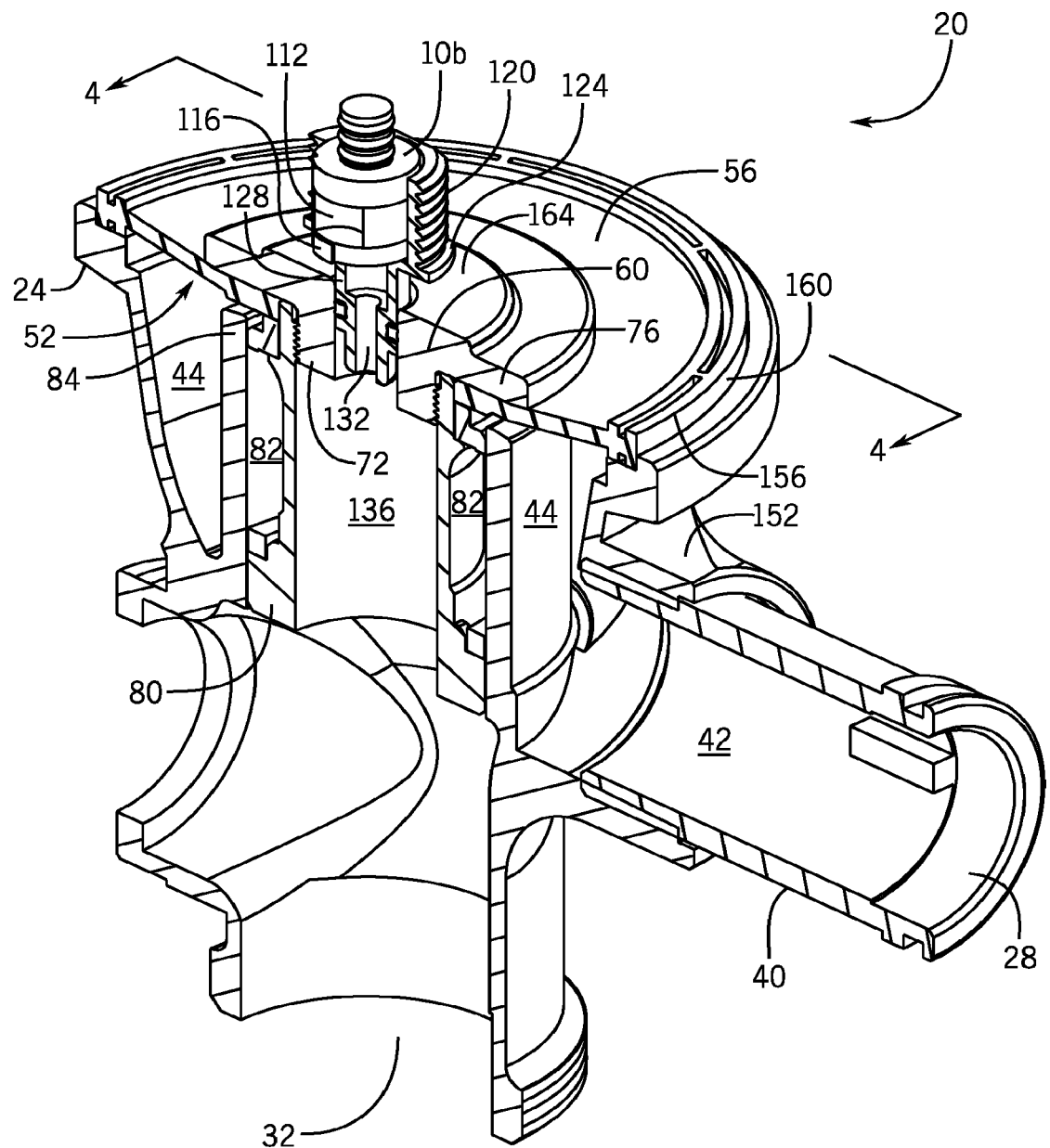
FIG. 2 is a perspective sectional view of a portion of the flush valve excluding the outer cover, rigid member, motor, and gear train.

FIG. 2 shows a sectional perspective view of the flush valve 20 shown in FIG. 1. As best seen in this view, an inlet opening 152 in the housing receives the inlet extension 40. The inlet opening 152 fixes the inlet extension 40 to the lower housing body 24 and provides fluid communication between the inner chamber 42 of the inlet extension 40 and the lower chamber 44 of the lower housing body 24. The lower chamber 44 of the housing circumferentially surrounds the valve seat 84.

An outer diaphragm groove 156 may allow the diaphragm 56 to be secured between the upper housing body 22 and the lower housing body 24. The outer diaphragm groove 156 may be within an outer diaphragm profile 160 which provides an increased thickness around the outer circumference of the diaphragm 56. The outer diaphragm groove 156 may be in the top surface and bottom surface of the outer diaphragm profile 160. In some embodiments, the outer diaphragm groove 156 on the bottom surface of the outer diaphragm profile 160 is secured by the lower housing body 24 and the outer diaphragm groove 156 on the top surface of the outer diaphragm profile 160 may be secured by the fixed member 96 as best depicted in FIG. 1.

A bottom surface of outward protrusion 76 of the disc 60 may be fixed to a top surface of the diaphragm 56. The outward protrusion 76 of the disc 60 has a raised inner area 164 that has a thickness greater than the thickness of the outward protrusion 76. The disc 60 surrounds the lower body 128 of the relief valve housing 120 that is centrally positioned through the diaphragm assembly 52.

Figure 3:
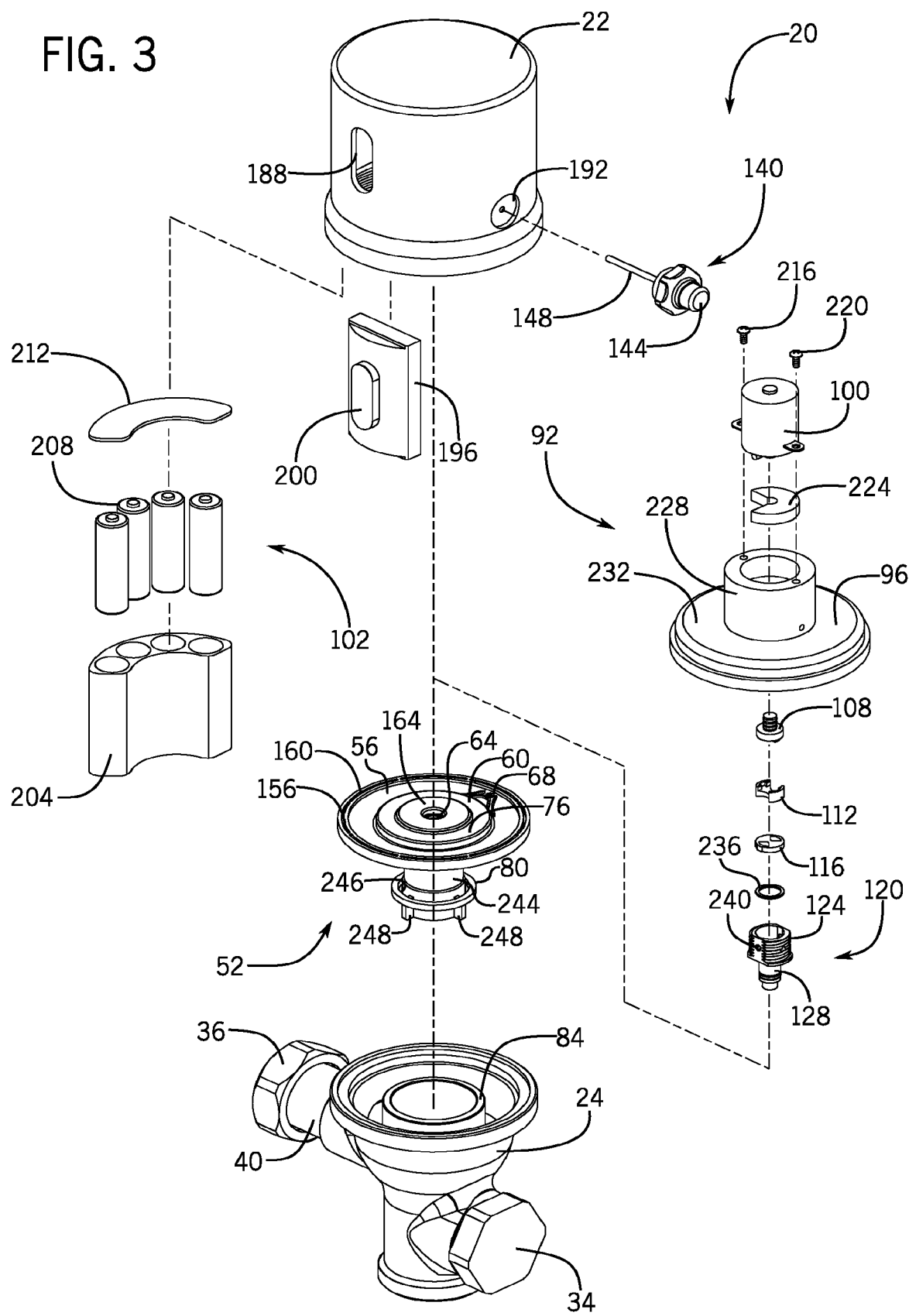
FIG. 3 is an exploded view of the flush valve.

Referring now to FIG. 3, the housing includes an upper housing body 22 and a lower housing body 24. The upper housing body 22 has a sensor opening 188 and a manual actuation opening 192 and each may be any appropriate shape. As shown in a nonlimiting example, the sensor opening 188 may be rectangular with rounded edges oriented vertically on the upper housing body 22, and the manual actuation opening 192 may be circular. The sensor opening 188 may be any appropriate shape to receive a sensor 196 that is positioned within the upper housing body 22 or to permit the sensor 196 to sense therethrough. The sensor 196 may have an outward protrusion 200 that may be configured to fit within the sensor opening 188 for purposes of assembly or construction. In the form illustrated, the upper housing body 22 is configured to contain the diaphragm assembly 52, the relief valve assembly 92, and the sensor 196.

The power source 102 is received within the upper housing body 22. The power source 102 may include a battery housing 204, one or more batteries 208, and a battery housing cover 212. The battery housing 204 may have a curved structure that is configured to fit within an inner wall of the upper housing body 22. The battery housing 204 may be configured to contain one or more batteries 208 within one or more battery chambers 206 within the battery housing 204. In some embodiments, the batteries 208 may be arranged vertically within the battery housing 204. The battery housing cover 212 may be configured to close the battery housing 204 with a shape that may match the curved structure of the battery housing 204. A bottom surface of the battery housing cover 212 may contact a top surface of the battery housing 204 and may be secured thereon.

The manual actuation assembly 140 may be received in the manual actuation opening 192 in the upper housing body 22. The actuation interface 144 may be outside of the upper housing body 22 while the actuation member 148 may extend within the upper housing body 22 through the manual actuation opening 192.

The relief valve assembly 92 may be received within the upper housing body 22. The motor 100 may be positioned above a rotational stop 224 that indicates the position of the motor 100. The motor 100 may be secured to the fixed member 96 via screws 216, 220 fixed to a top surface of an upper body 228 of the fixed member 96. The upper body 228 of the fixed member 96 may extend vertically from a lower body 232 of the fixed member 96. The upper body 228 of the fixed member 96 may be cylindrical having a hollow inner chamber configured to receive the driving member 108, the rotatable valve element 112, the stationary valve element 116, an O-ring 236 and the relief valve housing 120. The lower body 232 of the fixed member 96 may extend radially outward from a bottom surface of the upper body 228 of the fixed member 96. The driving member 108 may be positioned above the rotatable valve element 112 that is positioned above the stationary valve element 116. O-ring 236 is received at the bottom of the upper body 124 of the relief valve housing 120 which receives the driving member 108, the rotatable valve element 112, the stationary valve element 116, and the O-ring 236. The upper body 124 of the relief valve housing 120 may have a relief valve inlet 240 positioned on a flat outer surface of the upper body 124 of the relief valve housing 120.

The relief valve assembly 92 is positioned above the diaphragm assembly 52 within the upper housing body 22. The diaphragm assembly extension 80 extends below the diaphragm 56 and features a diaphragm assembly extension upper support 244 and one or more diaphragm assembly extension lower supports 248. A bottom surface of the diaphragm assembly extension upper support 244 is fixed to a top surface of one or more diaphragm assembly extension lower supports 248. The diaphragm assembly extension upper support 244 is cylindrical in shape and wraps around the diaphragm assembly extension 80 while leaving a gap 246 around an outer surface of the diaphragm assembly extension 80. The one or more diaphragm assembly extension lower supports 248 are rectangular and are positioned vertically on the outer surface of the diaphragm assembly extension 80. The one or more diaphragm assembly extension lower supports 248 are spaced radially around the perimeter of the diaphragm assembly extension 80. The one or more diaphragm assembly lower supports 248 may be placed at 90 degree intervals around an outer surface of the diaphragm assembly extension 80.

The diaphragm assembly 52 contacts a top surface of the valve seat 84 and the diaphragm assembly extension 80 extends into the lower housing body 24.

Referring now to FIG. 4, a cross section of the relief valve assembly 92 is shown. The relief valve assembly 92 may be assembled with the shaft 104 of the motor 100 extending through the rotational stop 224. A motor shaft extension 260 is cylindrical in shape and extends perpendicularly outward from the shaft 104 to selectively contact an inner face of the rotational stop 224, depending on the position of the shaft 104 and the rotational stop 224. The shaft 104 is fixed to the driving member 108. In some embodiments, a bottom surface of the shaft 104 may be fixed to a top surface of the driving member 108. In other embodiments, the shaft 104 and the driving member 108 may be connected by a keyed connection, D-shape connection, geared connection, or any other suitable connection between a motor shaft and a driving member. The driving member 108 has O-rings 264, 268, 272 that are positioned between the driving member rings 276. The driving member rings 276 and O-rings 264, 268, 272 are positioned above a driving member body 280 that extends radially outward from the driving member rings 276. The driving member body 280 may be cylindrical in shape and may have a driving member arm 284 that extends from a bottom surface of the driving member body 280.

The driving member arm 284 is received within one or more rotatable valve element walls 288 that extend vertically from the rotatable valve element 112. A top surface of the rotatable valve element 290 has a shape that is concave up thereby recessing away from the driving member arm 284. The relief valve inlet 240 is positioned in a wall of the upper body 124 of the relief valve housing 120 at a vertical position that provides an opening between the driving member arm 284 and the rotatable valve element 112 between the rotatable valve element walls 288. The upper body 124 of the relief valve housing 120 has threads 292 on an outer surface of the upper body 124 of the relief valve housing 120. The threads 292 are positioned above an outer ledge 296 of upper body 124 of relief valve housing 120 that separate the upper body of the relieve valve housing 124 from the lower body 128 of the relief valve housing 120. The lower body 128 of the relief valve housing 120 extends from a lower surface of the outer ledge 296 of upper body 124 of relief valve housing 120 and is received within an O-ring 300. The O-ring 300 is received within a lower body extension 304 that extends outward from an exterior surface of the lower body 128 of the relief valve housing 120. The relief valve chamber 132 may be defined between interior walls of the lower body 128 of the relief valve housing 120.

FIG. 5 shows an exploded view of the relief valve assembly 92. The rotational stop 224 has a central opening 306 that receives the shaft 104. The rotational stop 224 has a cylindrical shape that has a profile opening 308 with a removed angled wedge from the cylindrical shape of the rotational stop 224. A non-limiting example of the wedge angle may be 90 degrees.

The driving member arm 284 is rectangular in shape and has rounded ends. The driving member arm 284 extends along the bottom surface of the driving member body 280 to a length that allows the driving member arm 284 to be received within the rotatable valve element walls 288. The rotatable valve element 112 may have inward curved surfaces 312 that create openings through the rotatable valve element 112 that selectively align with one or more openings 316 in the stationary valve element 116. The inward curved surfaces 312 of the rotatable valve element 112 create an hour-glass profile of the rotatable valve element 112 that match a bottom surface profile 314. The bottom surface profile 314 is cut into the bottom surface of the rotatable valve element 112. The openings 316 in the stationary valve element 116 are wedged-shaped openings that may be cut normally through a top and bottom surface of the stationary valve element 116. The stationary valve element 116 has a cylindrical shape with the openings 316 cut therethrough. The stationary valve element 116 has tabs 320 extending from the outer surface that are configured to secure the stationary valve element 116 in a rotationally fixed position.

The upper body 124 of the relief valve housing 120 has one or more flat faces 322. As shown, the relief valve housing has a two flat faces 322 positioned on opposing sides of the upper body 124 of the relief valve housing 120. Each flat face may feature one or more relief valve inlets 240 that may be circular openings in the flat face 322. The flat faces 322 create a flow path that provides fluid communication between the upper chamber 88 and the relief valve assembly 92 via the one or more relief valve inlets 340.

Figure 6:
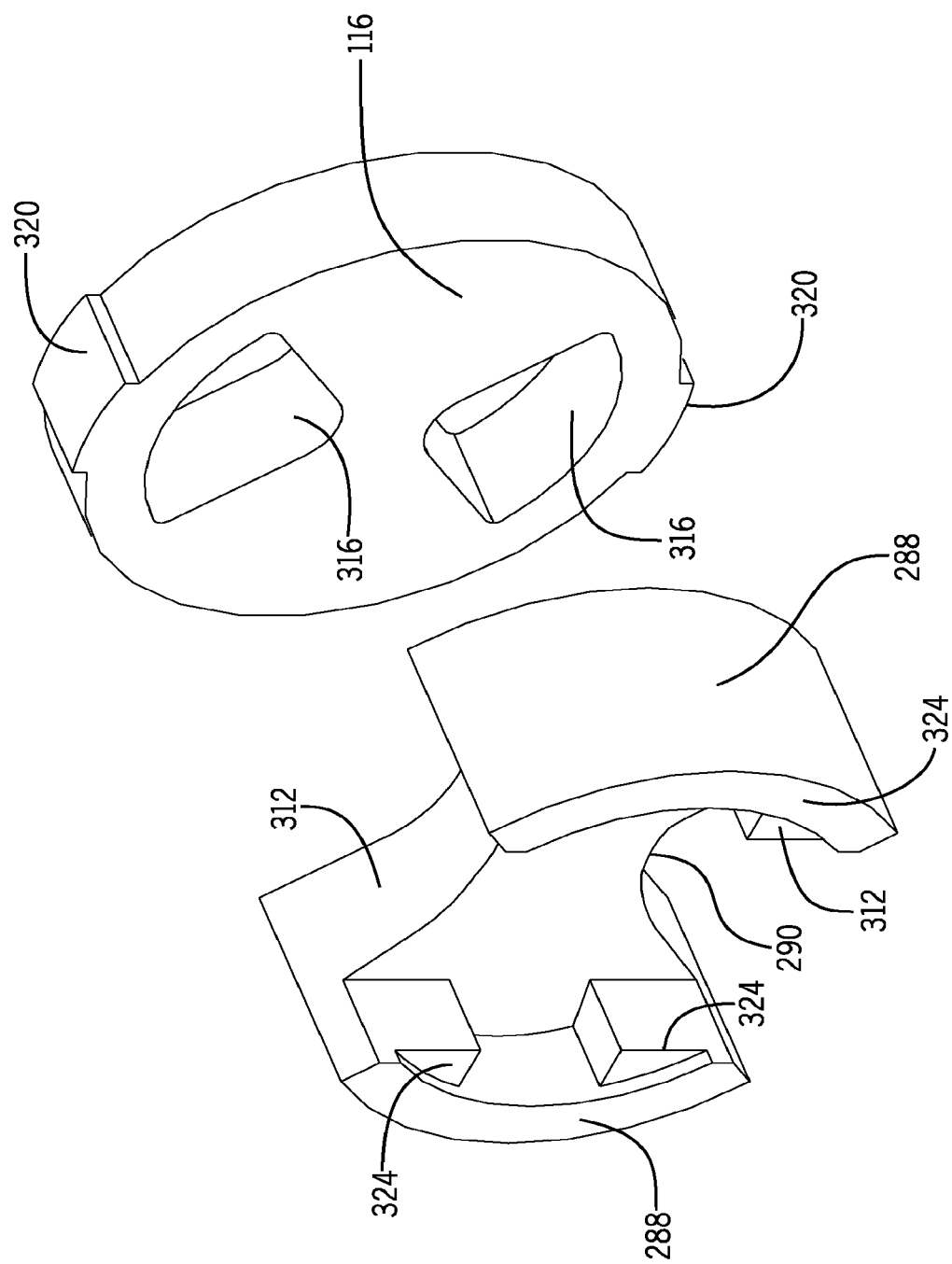
FIG. 6 is a perspective view of the stationary valve member and the rotatable valve member.

FIG. 6 shows the rotatable valve element 112 and the stationary valve element 116. The rotatable element 112 has a pair of driving member arm supports 324 that extend vertically from the top surface of the rotatable valve element 290. The driving member arm supports 324 are positioned against the rotatable valve element walls 288 when the rotatable valve element 112 is received in the relief valve housing 120. The driving member arm supports 324 are positioned in order to receive the driving member arm 284 in a gap between the driving member arm supports 324.

Now that the components of the flush valve 20 have been described in detail, their respective functionalities may be appreciated. Referring to FIGS. 4, 5, and 6, the motor 100 may be configured to generate rotational motion that is translated to the shaft 104. The rotational motion of the shaft 104 causes rotational motion of the motor shaft extension 260, which rotates into selective contact with an inner surface of the rotational stop 224 within the profile opening 308. Rotational motion of the shaft 104 translates rotational motion to the driving member 108 and, consequently, the driving member arm 284. The driving member arm 284 received within the driving member arm supports 324 in the rotatable valve element 112 causes rotation of the rotatable valve element 112.

Rotation of the rotatable valve element 112 may change the rotational position of the inward curved surfaces 312 of the rotatable valve element 112, which may selectively move the rotational position of the openings of the rotatable valve element 112. Selective movement of the openings through the rotatable valve element 112 defines a plurality of positions of the relief valve assembly 92. A first position of the relief valve assembly 92 is an open position defined by the openings through the rotatable valve element 112 aligning with the openings 316 in the stationary valve element 116. Alignment of the openings in the rotatable valve element 112 with the openings 316 in the stationary valve element 116 allows fluid communication through the relief valve assembly 92. A second position of the relief valve assembly 92 is a closed position defined by the openings through the rotatable valve element 112 not aligning with the openings 316 in the stationary valve element 116. In the closed position, the openings 316 in the stationary valve element 116 are covered by rotatable valve element 112. In the closed position, fluid communication is prohibited to pass through the relief valve assembly 92.

Illustratively, the relief valve assembly 92 may include one or more moveable and/or translatable valve elements. The one or more moveable and/or translatable valve elements may be selectively moved or translated with respect to one or more stationary valve elements. Movement of the one or more moveable and/or translatable valve elements selectively provides fluid communication between the chamber 88 and the relief valve chamber 132.

Now with reference to FIGS. 7-9, the initiation of a flush cycle by temporarily actuating the relief valve assembly 92 from the closed position to the opened position is illustrated. This brief opening of the relief valve assembly 92 will cause the entire diaphragm assembly 52 to lift, permitting water to travel from the inlet 28 to the outlet 32.

FIG. 7 shows a detailed area A-A of the flush valve 20 in a closed position with fluid retained in the flush valve 20 and is unable to enter the outlet chamber 136 because the diaphragm assembly 52 remains sealed against the upper lip of the valve seat 84. Fluid provided through the inlet 28 (not shown in FIG. 7, but found in prior figures) into the inner chamber 42 which is in fluid communication with the lower chamber 44. The lower chamber 44 surrounds outside wall the valve seat 84 and is in fluid communication with the chamber 88 via the bypass opening 68 in the diaphragm 56. The bypass opening 68 places the lower chamber 44 in fluid communication with the upper chamber 88. The relief valve inlets 240 extends from the flat faces 322 of the relief valve housing 120 (see FIG. 5). The flat faces 322 of the relief valve housing 120 produce a gap between the flat faces 322 and the fixed member 96. The gap between the one or more flat faces 322 and the fixed member 96 provides fluid communication between the upper chamber 88 and the relief valve assembly 92 via the relief valve inlets 240. In the position illustrated in FIG. 7, the relief valve assembly 92 is in the closed position defined by the openings in the stationary valve element 116 being covered by the rotatable valve element 112 thereby preventing fluid from flowing past the stationary valve element 116.

As mentioned above, the diaphragm assembly 52 is in a closed position while the relief valve assembly 92 is in the closed position. The closed position of the diaphragm assembly 52 is defined by the diaphragm assembly 52 being received against the valve seat 84 creating a seal therebetween. The diaphragm assembly 52 may be held in a closed position by the force of fluid in the chamber 88, exerting a downward force on the diaphragm 56 and the disc 60, thereby pressing the diaphragm assembly 52 against the valve seat 84.

FIG. 8 shows the area A-A of the flush valve 20 just after the relief valve assembly 92 has been opened to initiate the opening of the flush valve 20, but before water was passed entirely through the relief valve assembly 92 to permit the diaphragm assembly 52 to lift. The open position of the flush valve is achieved when the motor 100 or actuation member 148 selectively rotates the rotatable valve element 112 such that the openings in the rotatable valve element 112 align with the openings in the stationary valve element 116 creating fluid communication through the relief valve assembly 92 such that water may pass from the upper chamber 88 into the outlet chamber 136. Just after the relief valve assembly 92 has been opened, the diaphragm assembly 52 may remain in the closed position. The diaphragm assembly 52 may remain in the closed position just after the relief valve assembly 92 opens because the pressure exerted on the diaphragm assembly 52 temporarily holds it on the valve seat 84 as the pressure has not been relieved through the outlet chamber 136.

FIG. 9 shows the area A-A of the flush valve 20 where the relief valve assembly 92 has remained opened and the diaphragm assembly 52 has lifted such that the flush valve 20 is in the open position. The open position of the flush valve 20 is achieved when the fluid from the upper chamber 88 is allowed to flow through the relief valve chamber 132 and into the outlet chamber 136 for a sufficient duration of time to break the seal at the valve seat 84. Fluid flow through the relief valve chamber 132 into the outlet chamber 136 relieves pressure in chamber 88 exerted on the diaphragm assembly 52. Under this change in pressure, the diaphragm 56 is flexible upward which causes vertical translation of the diaphragm assembly 52 away from the valve seat 84 to break the seal. Vertical translation of the diaphragm assembly 52 away from the valve seat 84 provides direct fluid communication between the lower chamber 44 and the outlet chamber 136 via the peripheral chamber 82. Put another way, with the diaphragm assembly 52 unseated from the valve seat 84, the inlet 28 and the outlet 32 are placed in direct fluid communication with one another past the upper opening in the valve seat 84.

To close the flush valve 20, the motor 100 or the actuation member 148 rotates the rotatable valve element 112 such that the one or more openings in the stationary valve element 116 are covered by the rotatable valve element 112 thereby preventing fluid from flowing past the stationary valve element 116 (i.e., the relief valve assembly 92 is closed). After returning to the closed position, the pressure will rise in upper chamber 88 as fluid communication between upper chamber 88, the relief valve chamber 132, and the outlet chamber 136 are shut off. The increased pressure in upper chamber 88 translate the diaphragm assembly 52 back down into a closed position by pressing the diaphragm assembly 52 against the valve seat 84, as shown in FIG. 7. The closed position of the diaphragm assembly 52 again, at least temporarily, prevents fluid communication between the lower chamber 44, the peripheral chamber 82, and the outlet chamber 136.

The flush valve 20 may be selectively in the open position for a pre-defined or selected period of time and that period of time may define a flush cycle. The period of time may be an appropriate amount of time to generate fluid flow through the flush valve 20 given the fixture on which the valve is received such as a urinal or toilet. A non-limiting example of a period of time range the relief valve assembly 92 may be in an open position for may be 0.5 to 3 seconds which may result in the flush valve to be open from 3 to 10 seconds. The time the relief valve assembly 92 is selectively in an open position may not be the time required to complete a flush, as the flush valve 20 may be in a closed position while residual fluid may flush.

A flush cycle may be initiated manually or automatically. An automatic flush cycle may occur when the sensor 196 detects a user has approached the flush valve 20 and will actuate the cycle when the identified user has left the flush valve 20. The sensor may communicate control instructions to the motor 100 to selectively rotate the relief valve assembly 92 into the open position in order to initiate a flush cycle. Alternatively, a flush cycle may be initiated manually using the manual actuation assembly 140. A user may use the actuation interface 144 to initiate a flush cycle where the manual actuation assembly 140 may selectively rotate the relief valve assembly 92 into an open position. The manual actuation assembly 142 may selectively rotate the relief valve assembly 92 into an open position in the absence of power.

It should be appreciated that various other modifications and variations to the preferred embodiments can be made within the spirit and scope of the invention. Therefore, the invention should not be limited to the described embodiments. To ascertain the full scope of the invention, the following claims should be referenced.

What is claimed is:

1. A flush valve comprising:
    a valve housing defining a fluid passageway between a fluid inlet and a fluid outlet, the fluid passageway having a diaphragm valve seat disposed between the fluid inlet and the fluid outlet;
    a diaphragm assembly including a diaphragm and a disc, wherein the disk defines a central axis and an aperture extending axially therethrough, the diaphragm having a primary opening and a bypass opening, the primary opening receiving the disc therein and the bypass opening allowing water under pressure supplied to the fluid inlet to pass from a fluid inlet side of the diaphragm into a chamber in the fluid passageway established by a presence of the diaphragm assembly in the fluid passageway, wherein the diaphragm assembly is disposed in the fluid passageway and is movable axially between an opened position in which the disc of the diaphragm assembly is not in contact with the diaphragm valve seat and a closed position in which the disc of the diaphragm assembly is in contact with the diaphragm valve seat; and
    a relief valve configured to selectively control fluid flow from the chamber to the fluid outlet, the relief valve comprising a relief valve housing, a stationary valve element at least partially positioned within the relief valve housing, and a rotatable valve element at least partially positioned within the relief valve housing, wherein each of the stationary valve element and the rotatable valve element have at least one opening and are rotationally positionable relative to one another to regulate fluid flow, wherein the relief valve housing is at least partially positioned within and movable axially along the aperture of the disk while forming a water-tight seal therebetween, and wherein the relief valve housing defines a valve inlet open to and in fluid communication with the chamber and a valve outlet in fluid communication with the fluid outlet;

wherein in the closed position of the diaphragm assembly and with the relief valve closed, the disc contacts the diaphragm valve seat to form a seal therebetween, and wherein, when the flush valve is activated the relief valve is opened to permit a flow of water from the chamber into the fluid outlet thereby relieving a fluid pressure in the chamber and causing diaphragm assembly to move from the closed position to the opened position such that the disc is unseated from the diaphragm valve seat permitting water to pass from the fluid inlet to the fluid outlet.

2. The flush valve of claim 1, wherein when the diaphragm assembly is in the open position and the relief valve is in the closed position, fluid pressure builds in the chamber causing the disc to contact the diaphragm valve seat thereby forming a seal therebetween, returning the diaphragm assembly to the closed position.

3. The flush valve of claim 1, wherein the chamber in the fluid passageway is established by a presence of the diaphragm assembly in the fluid passageway and a fixed member disposed within the valve housing, the fixed member contacts the diaphragm in at least one radial position and has an extension that extends away from the diaphragm assembly, the extension of the fixed member has an inner chamber.

4. The flush valve of claim 3, wherein the inner chamber of the fixed member is configured to receive a motor and a gear train and is coaxial with the relief valve.

5. The flush valve of claim 3, wherein the fixed member is configured to ensure accurate flush volume.

6. The flush valve of claim 4, wherein the relief valve is configured to be coaxial with the motor.

7. The flush valve of claim 1, wherein the position of the rotatable valve element is configured to be controlled by a motor and a gear train.

8. The flush valve of claim 1, wherein the relief valve housing has an inlet region and an outlet region, the inlet region being configured to receive the stationary valve element and the rotatable valve element, the inlet region has two flat outer faces with one or more openings in selective fluid communication with the chamber, the outlet region being configured to allow fluid to pass through the valve outlet when the relief valve is in the open position.

9. The flush valve of claim 1, wherein the diaphragm valve seat defines a peripheral fluid passageway wherein the peripheral fluid passageway is in fluid communication with the fluid inlet and the fluid outlet when the diaphragm assembly is in the open position thereby allowing additional fluid to flow from the fluid inlet to the fluid outlet.

10. The flush valve of claim 1, wherein the relief valve is a quarter-turn valve.

11. The flush valve of claim 1, wherein the relief valve is a half-turn valve.

12. The flush valve of claim 1, wherein the relief valve is an eighth-turn valve.

13. The flush valve of claim 1, wherein the diaphragm is selectively flexible.

14. The flush valve of claim 1, wherein the diaphragm is configured to bend to allow the diaphragm assembly to move from the closed position to the open position.

15. The flush valve of claim 1, wherein the disc has a circular outer periphery.

16. The flush valve of claim 1, wherein the relief valve is configured to be in an open position from 0.5 to 3 seconds which results in the flush valve being open from 3 to 10 seconds.

17. The flush valve of claim 1, wherein the rotatable valve element is ceramic.

18. The flush valve of claim 1, wherein the relief valve further comprises at least one seal that prevents fluid communication external to the fluid passageway.

19. The flush valve of claim 1, wherein the chamber is in fluid communication with the relief valve via a channel running from the chamber to the relief valve.

20. A method for operating a flush valve, the method comprising the steps of:
  (a) providing a fluid under pressure to a fluid passageway in a valve housing via a fluid inlet;
  (b) communicating the fluid through a bypass opening in a diaphragm assembly into a chamber, the diaphragm assembly is disposed in the fluid passageway and is movable between an opened position in which the diaphragm assembly is not in contact with a diaphragm valve seat and a closed position in which the diaphragm assembly is in contact with the diaphragm valve seat, wherein the chamber is established by a presence of the diaphragm assembly in the fluid passageway, and wherein the diaphragm assembly defines a diaphragm axis and an aperture extending axially therethrough;
  (c) communicating the fluid in the chamber into a relief valve assembly, the relief valve assembly comprising a relief valve housing, a stationary valve element at least partially positioned within the relief valve housing, and a rotatable valve element at least partially positioned within the relief valve housing, wherein each of the stationary valve element and the rotatable valve element have at least one opening and are rotationally positionable relative to one another to regulate fluid flow, wherein the relief valve housing is at least partially positioned within the aperture to form a water-tight seal therebetween, and wherein the relief valve housing defines a valve inlet open to an in fluid communication with the chamber and a valve outlet in fluid communication with the fluid outlet;
  (d) rotating the rotatable valve element into an open position such that the at least one opening of the rotatable valve element aligns with the at least one opening of the stationary valve element;
  (e) communicating the fluid through the relief valve assembly to a fluid outlet; and
  (f) axially translating the diaphragm assembly along the relief valve housing from the closed position to the open position such that the diaphragm assembly is unseated from the diaphragm valve seat permitting water to pass from the fluid inlet to the fluid outlet.

* * * * *